Sept. 24, 1929.  A. J. BENTLEY  1,728,920
TRUCK
Filed Sept. 30, 1927
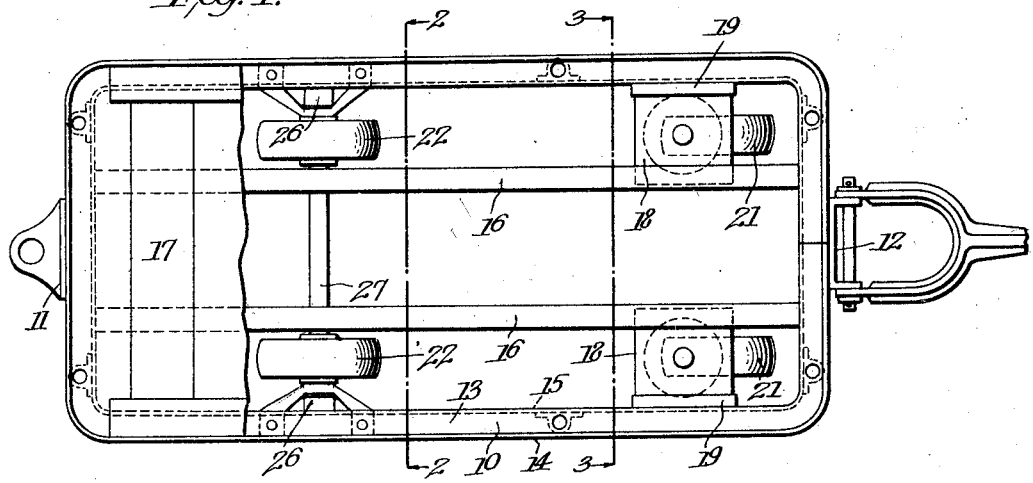
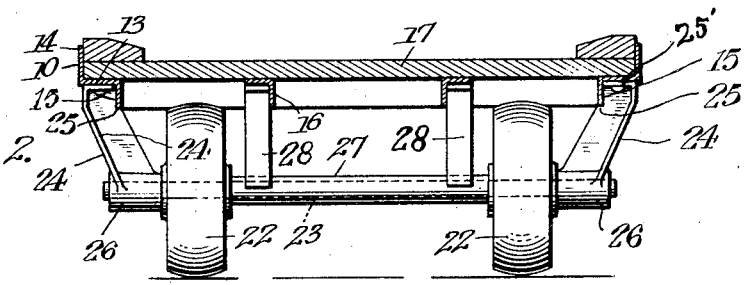
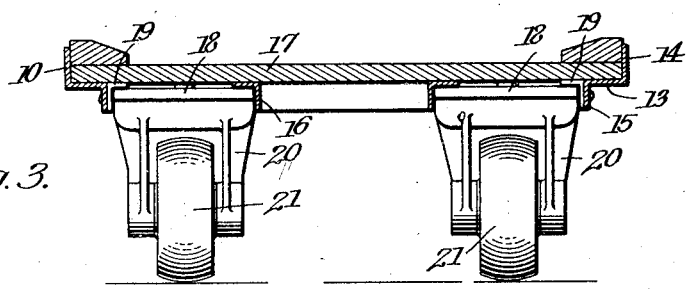
Inventor
Anson J. Bentley Patented Sept. 24, 1929

1,728,920

UNITED STATES PATENT OFFICE

ANSON J. BENTLEY, OF NILES, OHIO

TRUCK

Application filed September 30, 1927. Serial No. 222,969.

My invention relates to portable trucks, particularly trailer trucks, adapted to be coupled together in series for factory and similar uses, and aims generally to improve such trucks.

Among some of the important objects of my invention are to improve the construction of a truck so that it will possess maximum strength to resist strains of heavy loads, yet be comparatively light in weight; also to provide a novel and extremely strong construction at the connection of the rear axle hangers or brackets to the frame.

In the accompanying drawings wherein I have selected one embodiment of the invention, for illustrative purposes:

Fig 1 is a top plan view of the truck, a portion of the platform being broken away to show more clearly the construction of the frame and associated parts;

Fig. 2 is a sectional view of the truck taken on the line 2—2 of Fig. 1; and

Fig. 3 is a similar view taken on the line 3—3.

The form of trailer truck, shown in the drawings by way of example, comprises a frame 10 of rectangular or other suitable shape, which is Z-shaped in cross-section. Advantageously the frame is made of a single piece of Z-iron bent to the desired shape, although it may be made of two similar U-shaped Z-iron sections connected together at their adjacent ends, or may be built up of reversed superimposed angle-iron sections, when the weight of the truck is not an important factor. The adjoining ends of the truck frame 10 may be suitably connected together, in any desirable way, as by welding, or by connecting plates 11 and 12, forming parts of coupling members, by means of which the trucks may be connected together in series, in the usual manner.

The Z-bar frame is preferably arranged so that the web portion 13 is horizontally disposed with the upwardly extending flange 14 and the downwardly extending flange 15 laterally spaced from each other as shown. The construction provides a frame which will adequately resist the strain of heavy loads, placed on the truck, yet permits of the use of comparatively light gauge material. The frame 10 is suitably reinforced, as by one or more longitudinally extending bars 16, herein shown as of angle iron construction, preferably arranged so that the horizontal flange is uppermost and in the plane of the horizontal web portion 13 of the Z-bar frame, so as to provide an intermediate support for the platform 17, herein illustrated as being formed of wood, as is customary in certain types of trucks. The longitudinal bars 16 may be connected to the end portions of the Z-bar frame in any suitable manner.

Near the forward end of the truck are provided caster supporting members 18, horizontally disposed and lying approximately in the plane of the horizontal web 13 of the Z-bar frame and horizontal flange of the bars 16. The caster supporting members 18 include a downwardly turned flanged portion 19, along one side thereof. The portion 19 may be formed integrally with the member 18 but for purposes of illustration I have shown it as a separate angle-iron member, having one flange suitably attached to the member 18, as by welding, riveting, or otherwise, and the other flange suitably connected to the vertical downwardly extending flange 15 of the Z-bar frame. The ends of the members 18 opposite the flanged ends 19 are suitably secured to the under side of the horizontal flange of the bar 16, so that the caster supporting member will lie in a plane very close to the truck platform The caster supporting members carry the pivotally mounted caster yokes 20 and caster wheels 21 in the usual manner.

The rear portion of the truck is supported by wheels 22 suitably mounted on an axle 23 which is supported in axle hangers or brackets 24 connected to the frame 10. As shown, (see Fig 2) the axle hangers are formed with a shoulder portion 25 to engage the lower edge of the flange 15 of the Z-bar frame 10, while the top 25' of the hanger engages the under side of the horizontal flange 13 of the Z-bar and is rigidly connected thereto, as by rivets or otherwise, thus permitting the weight of the load on the platform to be carried by the axle and hangers without subjecting the rivets or other connecting means to undue strain. The bearing portions 26 of the hangers preferably project inwardly toward the center of the truck, so that the entire rear axle assembly, including the hangers, are confined within the marginal limits of the truck frame. The wheels 22 are held in spaced apart relation by suitable means, as by a sleeve 27, which may be additionally braced against deflection by hanger bars 28 secured to the bars 16 and bearing against the sleeve 27.

Advantages of my improved truck reside in its simplicity, durability and strength. The use of the Z-bar frame providing laterally spaced vertical flanges provides adequate support to resist the vertical strains. The construction and manner of assembling the rear axle hangers to the frame provides a simple and easy construction to assemble lending adequate support for the load, and relieving the attaching bolts or rivets from undue strain.

What I claim as new is:

1. A truck comprising a substantially rectangular frame having laterally spaced upwardly and downwardly extending flanges and intermediate horizontal web portions, longitudinal bars having horizontal and vertical flanges and connected to the ends of said frame, caster supporting members each including a horizontal portion and a vertically extending flanged portion, secured to the under side of the horizontal flange of the longitudinal bars and to the vertical downwardly extending flange of the side frame respectively, and lying approximately in the plane of the horizontal flanges, and caster wheels journalled on said supporting members.

2. A truck comprising a substantially rectangular frame having laterally spaced upwardly and downwardly extending flanges and intermediate horizontal web portions, longitudinal bars having horizontal and vertical flanges and connected to the ends of said frame, angle iron members secured to the downwardly extending flanges of the frame and arranged so that the horizontal flanges thereof are uppermost and face inwardly toward the longitudinal bars, horizontal caster wheel supports each connected to the underside of the horizontal flanges of said longitudinal bars and angle iron members and caster wheels carried by said supports.

3. A truck comprising a rectangular metal frame having integral laterally spaced vertical flanges and an intermediate horizontal web portion, brackets separately connected to the horizontal web portion of the frame, and extending downwardly therefrom, means on said brackets engaging the lower edge of the inner vertical flanges of said frame below the point of connection of the brackets to the frame, floor boards supported on the frame and confined within the outer vertical flange thereof, and bearing members on the lower ends of said brackets.

4. A truck comprising a rectangular metal frame having integral laterally spaced vertical flanges and an intermediate horizontal web portion, brackets separately connected to the horizontal web portion of the frame, and extending downwardly therefrom, a projecting shoulder portion on each of said brackets engaging the lower edge of the inner vertical flange of said frame below the point of connection of the brackets to the frame, floor boards supported on the frame and confined within the outer vertical flange thereof, and bearing members on the lower ends of said brackets.

5. A truck comprising a rectangular metal frame having integral laterally spaced vertical flanges and an intermediate horizontal web portion, one of the vertical flanges extending upwardly from the outer side portion of said web portion and the other vertical flange extending downwardly from the inner side of said web, brackets separately connected to the horizontal web portion of the frame, and extending downwardly therefrom, means on said brackets engaging the lower edge of the inner vertical flange of said frame below the point of connection of the brackets to the frame, floor boards supported on the frame and confined within the outer vertical flange thereof, and bearing members on the lower ends of said brackets, the arrangement permitting the mounting of an axle and supporting means within the confines of the side margins of the truck.

In testimony whereof, I have signed my name to this specification this 20th day of September, 1927.

ANSON J. BENTLEY.